(12) United States Patent
Zhang et al.

(10) Patent No.: US 8,305,982 B2
(45) Date of Patent: Nov. 6, 2012

(54) METHOD FOR ASSIGNING SIGNATURE SEQUENCES FOR E-HICH CHANNEL

(75) Inventors: Aimin Zhang, Shanghai (CN); Zhiqun Chen, Shanghai (CN); Yanshan Shi, Shanghai (CN)

(73) Assignee: Spreadtrum Communications (Shanghai) Co. Ltd., Shanghai (CN)

( * ) Notice: Subject to any disclaimer, the term of this patent is extended or adjusted under 35 U.S.C. 154(b) by 308 days.

(21) Appl. No.: 12/605,019

(22) Filed: Oct. 23, 2009

(65) Prior Publication Data

US 2010/0220672 A1 Sep. 2, 2010

Related U.S. Application Data

(63) Continuation of application No. PCT/CN2008/070790, filed on Apr. 24, 2008.

(30) Foreign Application Priority Data

Apr. 24, 2007 (CN) .......................... 2007 1 0093804

(51) Int. Cl.
*H04W 4/00* (2009.01)
(52) U.S. Cl. ........................................ 370/329
(58) Field of Classification Search .................. 370/329, 370/335; 455/114.2
See application file for complete search history.

(56) References Cited

U.S. PATENT DOCUMENTS

| | | | | |
|---|---|---|---|---|
| 6,567,482 B1* | 5/2003 | Popovic' | ....................... | 375/343 |
| 6,580,747 B1 | 6/2003 | Lipponen | | |
| 7,689,178 B2* | 3/2010 | Parkvall et al. | ............ | 455/114.2 |
| 7,733,828 B2* | 6/2010 | Qu et al. | ....................... | 370/330 |
| 8,074,147 B2* | 12/2011 | Lee et al. | ....................... | 714/758 |
| 2001/0017881 A1* | 8/2001 | Bhatoolaul et al. | ........... | 375/130 |
| 2006/0056360 A1* | 3/2006 | Parkvall et al. | ................ | 370/335 |
| 2007/0042785 A1* | 2/2007 | Nakamata | ....................... | 455/450 |
| 2007/0105503 A1* | 5/2007 | Kim | ................ | 455/70 |
| 2008/0031369 A1* | 2/2008 | Li et al. | ........................ | 375/260 |
| 2008/0101438 A1* | 5/2008 | Lee et al. | ....................... | 375/132 |
| 2008/0182594 A1* | 7/2008 | Flore et al. | ....................... | 455/458 |
| 2009/0028103 A1* | 1/2009 | Wang et al. | ................... | 370/329 |
| 2009/0262696 A1* | 10/2009 | Wei et al. | ....................... | 370/329 |
| 2009/0285168 A1* | 11/2009 | Choi et al. | ..................... | 370/329 |
| 2010/0272268 A1* | 10/2010 | Sambhwani et al. | ........ | 380/287 |
| 2011/0080972 A1* | 4/2011 | Xi et al. | ........................ | 375/267 |
| 2011/0110337 A1* | 5/2011 | Grant et al. | ................... | 370/335 |

FOREIGN PATENT DOCUMENTS

| | | |
|---|---|---|
| CN | 1287720 A | 3/2001 |
| CN | 1319283 | 10/2001 |
| CN | 1529438 | 9/2004 |
| WO | WO 0001092 | 10/2001 |

\* cited by examiner

*Primary Examiner* — Farah Faroul
(74) *Attorney, Agent, or Firm* — Dorsey & Whitney LLP

(57) ABSTRACT

A method for assigning signature sequences for E-HICH channel which may avoid the unbalanced situation brought about by the codeword assignment is provided, wherein the use of User Equipment (UE) signature sequences on Enhanced Dedicated Channel Hybrid Automatic Repeat Request Acknowledgement Indicator Channel (E-HICH) is equalized, so as to drive the average detection performance toward equity for different UEs to detect their respective signature sequences on E-HICH channel, and to reduce the average false detection rate for the respective UE on the feedback information transmitted thereto. The method includes: firstly, assigning a E-HICH logical signature sequence index r for each UE; then, converting the logical signature sequence index r into a physical signature sequence index r' varying with time by using a random permutation function; and after that, assigning a signature sequence corresponding to the physical signature sequence index r' to the respective UE.

6 Claims, 1 Drawing Sheet

--- obtaining E-HICH logical signature sequence index r for the UE converting the logical signature sequence index into
a physical signature sequence index varying with time
by using a random permutation function
related to the number of the sub-frame in which E-HICH is in

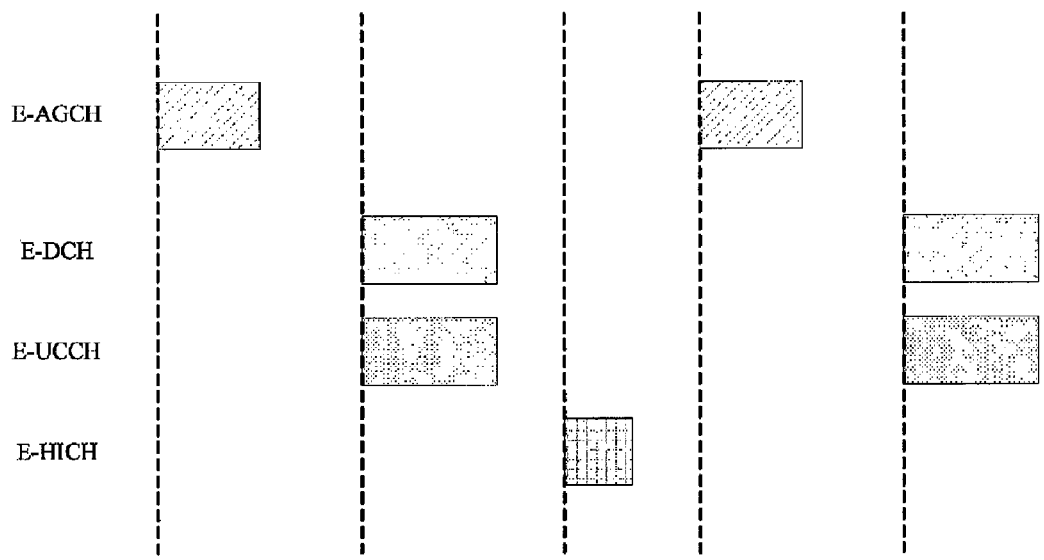
Fig 1
(Prior Art)
obtaining E-HICH logical signature sequence index r for the UE
converting the logical signature sequence index into
a physical signature sequence index varying with time
by using a random permutation function
related to the number of the sub-frame in which E-HICH is in
Fig 2
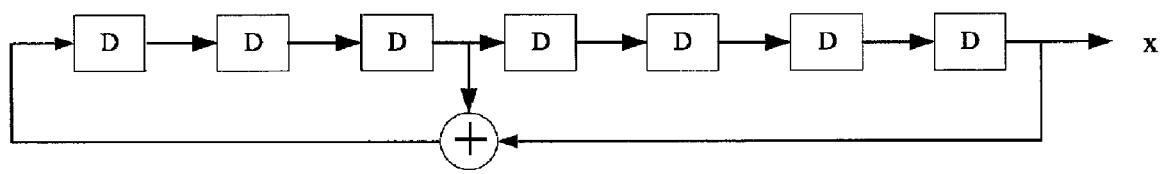
Fig 3

METHOD FOR ASSIGNING SIGNATURE SEQUENCES FOR E-HICH CHANNEL

CROSS REFERENCE TO RELATED APPLICATION(S)

This application is a continuation of International Patent Application No. PCT/CN2008/070790, filed Apr. 24, 2008, which claims priority to Chinese Application No. 200710093804.0, filed on Apr. 24, 2007, the entire contents of both of which are incorporated herein by reference.

FIELD OF INVENTION

The present disclosure relates generally to a method for assigning a signature sequence in a wireless communications system, and more specifically to a method for assigning a signature sequence in Enhanced Dedicated Channel Hybrid Automatic Repeat Request Acknowledgement Indicator Channel (E-HICH) for transmission of feedback information for E-DCH channel in Time Division-Synchronous Code Division Multiple Access (TD-SCDMA) system.

BACKGROUND

High Speed Uplink Packet Access (HSUPA) technique is introduced in 3GPP Release 7 for 1.28 Mcps option (i.e. TD-SCDMA system). This technique is mainly characterized by the introduction of Enhanced Dedicated Channel (E-DCH) for the uplink as well as several related PHY channels, and the use of Fast Node-B scheduling, Hybrid Automatic Repetition Request (HARQ), etc., so as to dramatically increase the capacity of the uplink.

Depending on whether a pre-assigned mode or an on-the-fly scheduling mode is employed by a User Equipment (UE) in the transmission of the uplink traffics, HSUPA may be divided into two modes: an on-schedule mode as a first mode, wherein UE transmits on a corresponding PHY channel according to an indication on the E-AGCH channel by a Node B (Base Station) whenever it transmits uplink data on E-DCH channel; and a non-schedule mode, wherein UE does not need to listen on E-AGCH channel, since the Node B has assigned a fixed PHY channel to the UE when assigning the E-DCH channel thereto.

In TD-SCDMA system, HSUPA relates to downlink PHY channels comprising E-DCH Absolute Grant Channel (E-AGCH) and E-DCH HARQ Indicator Channel (E-HICH); and relates to uplink PHY channels comprising E-DCH Physical Uplink Channel (E-PUCH), E-DCH Uplink Control Channel (E-UCCH), and E-DCH Random Access Uplink Control Channel (E-RUCCH). E-AGCH is for Node B to transmit schedule signaling, which comprises UE identification, PHY channel parameters, etc. For the on-schedule mode, said E-AGCH is also for the transmission of power control and sync control commands for E-PCH channel. E-HICH is for the transmission of feedback information for E-DCH channel. For a non-schedule user, said E-HICH is also for the transmission of uplink power control (TCP) and uplink sync control (SS) commands, etc. E-UCCH is for the transmission of signaling relating to uplink E-DCH transmission. E-PUCH is for the transmission of data of E-DCH and E-UCCH. E-RUCCH is for the UE to request for physical resources from the network side.

As shown in FIG. 1, for the on-schedule mode, HSUPA process comprises the following steps:

1. transmitting, by Node B, the identification of a UE and the related PHY channel parameters on E-AGCH;

2. transmitting, by the UE, upon hearing physical resource allocation thereto on E-AGCH, E-DCH data and the related uplink control information (E-UCCH) on the corresponding physical resource after appropriate delay (the specific delay is specified by the protocol);

3. transmitting feedback information by the Node B using a corresponding signature sequence after receiving the E-DCH data and appropriate delay according to whether the reception is correct or not, the feedback information comprising an Acknowledgement (ACK) or a Negative Acknowledgement (NAK), and an ACK is transmitted when Node B receiving the E-DCH data correctly, otherwise a NAK is transmitted.

The non-schedule mode is different from the on-schedule mode. And the differences mainly lie in that: in non-schedule mode, the PHY channel which is used by the UE to transmit E-DCH data is pre-assigned by the Node B, thus these is no need to listen on the E-AGCH channel; and that in addition to the feedback of ACK/NAK information, the Node B also needs to feedback power control and sync control commands on E-HICH.

In the HSUPA process above, the feedback information of the Node B for multiple UEs are transmitted on E-HICH. The feedback information for different UEs are spread using different "signature sequence". The choice of a signature sequence is in exact correspondence to the PHY channel (E-PUCH) parameter assigned to the UE for transmission of E-DCH data, therefore the respective UEs may know the signature sequence for itself according to the PHY channel assigned thereto, so that the feedback information for itself may be detected on E-HICH.

A signature sequence is obtained from a 80×80 orthogonal matrix $C_{80}$, the kth row of which is the kth signature sequence. Therefore, each signature sequence is of 80-bit long, and the sequential number of a signature sequence equals to its corresponding row number in the $C_{80}$ matrix. $C_{80}$ is formed by the tensor product, or Kronecker product, of two Hadamard matrixes, i.e. $C_{80}=C_{20} \otimes C_4$, wherein $\otimes$ denotes a tensor product, and wherein $C_{20}$ is a 20×20 Hadamard matrix, and $C_4$ is a 4×4 Hadamard matrix.

For the on-schedule mode, Node B transmits on E-HICH channel the feedback information ACK/NAK for the E-DCH data transmitted by the UE. The feedback information after coding is of 1 bit. The feedback information of the Node B for a UE is spread by the corresponding signature sequence for the UE, QPSK modulated, and further spread by a spreading code, and added with the feedback information for the other UEs before transmission, wherein $C_{80,r}$ denotes the rth signature sequence, and r is determined as follow:

$$r = 16(t_0 - 1) + (q_0 - 1)\frac{16}{Q_0},$$

wherein $t_0$ is of the first (lowest) timeslot assigned to the UE for the transmission of E-DCH data, $t_0=1, 2, \ldots, 5$; wherein $Q_0$ is the spreading factor assigned to the UE for the transmission of E-DCH data in timeslot $t_0$, $Q_0=1, 2, 4, 8, 16$; and wherein $q_0$ is the allocated chip, $q_0=1, 2, \ldots, Q_0$.

For the non-schedule mode, not only the feedback ACK/NAK for the E-DCH data transmitted by the UE is transmitted on E-HICH by the Node B, but also the power control (TPC) and sync control information (SS) for E-DCH channel is feedback. Here, the 80 signature sequences are divided into 20 groups, each group comprising 4 signature sequences. The first signature sequence in each group is used for the spreading of the feedback information ACK/NAK, and the remaining 3 signature sequences and the respective complement code thereof, i.e. 6 codes in total, form the 6 states representative of TPC/SS, each state identified by one bit. After being spread by the Node B using a corresponding signature sequence, the feedback information and TPC/SS commands for UE are QPSK modulated, spread by a spreading code, and added with the feedback information for the other UEs before transmission. For the non-schedule mode, the assignment of signature sequence to an UE is signaled by a higher level, rather than calculated by a fixed equation.

As can be seen from the method for assigning E-HICH channel signature sequence, for the on-schedule mode, when the PHY channel assigned to a UE for the transmission of E-DCH data is fixed, the signature sequence is fixed; while for the HSUPA process in the non-schedule mode, a higher level signals the signature sequence assigned to the UE, and the signature sequence remains unchanged during this HSUPA process.

The analysis on the cross-correlation of the signature sequences shows that, when two signature sequences are cross-correlated with a shift of one bit therebetween, the resulting cross-correlation is related to the numbering of the two sequences. When the difference between the numbering equals to or is less than 8, the cross-correlation between the two sequences is relatively large; and when the difference is larger than 8, the cross-correlation is relatively small. Such characteristic is related to how the signature sequences are formed. As known to those skilled in the art, the larger the cross-correlation is between two signals, the more difficult it is to detect them. This is due to the fact that a wireless channel is typically a multi-path channel, which means that the signal received at the receiving end is the accumulation of versions of the signal transmitted at the transmitting end undergone different delays, resulting Inter Symbol Interference (ISI) in the received signal. The receiving end usually uses an equalizer to equalize the received signal before performing signal detection so as to reduce ISI and improve the detection performance. However, practical equalizers have limited delays. Thus it is impossible to cancel ISI completely after equalization of the received signal. At this point, if the cross-correlation behavior of two signals is not good, then the false detection rate at the receiving end of the respective UEs for the feedback informations transmitted thereto.

During the HSUPA process, if the signature sequence used by a UE remains unchanged, then it means that the cross-correlations between the respective signature sequences remain unchanged. This a codeword of good cross-correlation performance results in low false detection rate by the UE on the feedback information transmitted thereto, while a codeword of relative poor cross-correlation performance results in relative higher false detection rate by the UE on the feedback information transmitted thereto, leading to an unbalanced situation wherein some of the UEs have good transmission performance for HSUPA, while others have poor transmission performance.

SUMMARY

The purpose of the present disclosure is to provide a method for assigning signature sequences for E-HICH channel which may avoid the unbalanced situation brought about by the codeword assignment in TD-SCDMA system, wherein the use of UE signature sequences on E-HICH channel is equalized, so as to drive the average detection performance toward equity for different UEs to detect their respective signature sequences on E-HICH channel, and to reduce the average false detection rate for the respective UE on the feedback information transmitted thereto.

To the accomplishment of the foregoing and related ends, the present disclosure provides a method for assigning signature sequences for E-HICH channel, comprising:

firstly, assigning a logical signature sequence index r for each UE;

then, converting the respective logical signature sequence index r into a physical signature sequence index r' varying with time by using a random permutation function; and after that, assigning a signature sequence corresponding to the respective physical signature sequence index r' to the respective UE, wherein the random permutation function is known to both a Node B and the respective UEs, and is implemented by consolidating the random permutation function used in the Node B and in the respective UEs, or by having the Node B signal the random permutation function used to the respective UEs.

The present disclosure achieves the following benefits by adopting the above mentioned technical solutions: by making the signature sequences used by the respective UE on the E-HICH channel to vary with time in a pseudo random way, the equalization of the use of UE signature sequences is attained, and the average false detection rate is reduced that UE have on the feedback information transmitted thereto, so that the unbalanced situation is avoided wherein some UEs have good HSUPA transmission performance while the others have poor transmission performance, i.e. the average detection performance that different UEs have in detecting the signature sequence thereof on E-HICH channel is driven toward equity; and the method of the present disclosure increases the satisfaction of the users, and enhances the capacity of TD-SCDMA system indirectly.

BRIEF DESCRIPTION OF THE DRAWINGS

The features and performance of the present disclosure will be described by the following embodiments and figures, and wherein:

FIG. 1 is a process diagram of HSUPA in TD-SCDMA system;

FIG. 2 is a flowchart of the assignment of signature sequences for E-HICH channel according to the present disclosure;

FIG. 3 is an exemplary scheme diagram of the shift register for generating a random number according to the present disclosure.

BEST MODE FOR CARRYING OUT THE INVENTION

The present disclosure addresses the shortcomings in E-HICH signature sequence assignment in existing protocols. A random permutation conversion process is added on basis of the existing protocol, causing the signature sequences of the respective UEs as used on E-HICH channel to vary with time in a pseudo random way, so as to drive the average detection performance for the respective UEs to detect the E-HICH channel signature sequence thereof towards equity.

FIG. 2 shows the flowchart of the assignment of signature sequences for E-HICH channel according to the present disclosure, the implementing steps thereof comprising:

firstly, assigning a signature sequence index for each UE according to the methods in the prior art protocols, wherein the signature sequence index resulting from the assignment of prior art being called a logical signature sequence index r in the present disclosure;

then, in order to drive the detection performance towards equity, converting the respective logical signature sequence index into a physical signature sequence index r' which varies with time by using a random permutation function, the physical signature sequence index r' after conversion is expressed by:

$$r'=P(r,SFN'),$$

wherein SFN' is representative of the sub-frame number in which E-HICH is in, P is representative of a random permutation function pre-established by the UE and the Node B, said random permutation function is chosen so as to ensure the converted signature sequence varies with time as uniformly as possible; and after that, assigning a signature sequence corresponding to the respective physical signature sequence index r' to the respective UE.

The method for assigning E-HICH channel signature sequences of the present disclosure is applicable to both HSUPA of on-schedule mode and HSUPA of non-schedule mode, details as follow.

For the on-schedule mode, in the present disclosure, Node B and UE calculate the signature sequence index as follow.

Firstly, the logical signature sequence of the UE is calculated by the equation according to the protocols:

$$r = 16(t_0 - 1) + (q_0 - 1)\frac{16}{Q_0}.$$

Then the physical signature sequence index for the UE is calculated by the following equation:

$$r'=P(r,SFN'),$$

such that the signature sequence for the UE is $C_{80,r'}$.

For the non-schedule mode, the logic signature sequence index r for the UE is assigned by the Node B, and then the physical signature sequence index for the UE is calculated by the following equation:

$$r'=P(r,SFN').$$

In the present disclosure, said random permutation function P should be known to the Node B and to each of the UEs within the cell, since it is implemented by consolidating the random permutation function P used in the Node B and in the respective UEs, or by having the Node B signal the random permutation function used to the respective UEs. Therefore, to all of the UEs within the same cell, such a random conversion relationship is identical to the Node B as to the UEs, and each of the UEs is capable of knowing accurately the signature sequence assigned thereto.

In the implementing of the present disclosure, the random permutation function P can be embodied in a number of ways, among which several practical embodiments are given below.

Embodiment 1

The random permutation function in this embodiment has the following steps in particular:

(1) initializing the permutation sequence, and in particular, setting the length M of said permutation sequence as M=80, and initializing the permutation sequence P, wherein P(0)=0, P(1)=1, . . . , P(M−1)=M−1; then setting i=0;

(2) calculating a permutation sequence P related to SFN', which further comprising in particular in this embodiment the following steps:

a. generating a random number k ranged from 0~M−i, the algorithm for generating the random number should be known to both the Node B and the UEs, and the system sub-frame number SFN' may be used as a seed for the generation;

b. permuting P(i) with P(k+i), i.e. temp=P(i), P(i)=P(k+i), P(k+i)=tmp;

c. i=i+1, repeating the above steps a-c until i=M−2.

In the above step a, there are a number of ways to generate the random number, but the random number generated must be known to both the transmitter and the receiver. There are a variety of methods for doing so, among which a method of utilizing a shift register is shown in FIG. 3, which comprising the following steps in particular:

I. having the length of the shift register as N, and initializing the shift register with the N bits of the system sub-frame number SFN';

II. choosing p so that $i<2^p$;

III. shifting the shift register s times consecutively, wherein s≧p, and preferably, s=3N, and resulting an output sequence x, and setting k=the p lowest significant bits of x;

IV. setting k=k−(M−i) if k>M−i, wherein in above step (I), there are a variety choices of the shift register. Generally speaking, the long a shift register is, the long the period of the resulting pseudo random sequence is, however the larger the amount of computation is. A shift register is usually represented by the polynomial generated thereby. For example, as to the shift register shown in FIG. 3, a polynomial $1+x^3+x^7$ is generated thereby. See the related references for the details of the principles of shift registers.

In above step (I), in addition to the above mentioned way in initializing the shift register, the N bits resulted from the calculation based on the combination of any code such as a cell Basic midamble code, Scrambling code known to both the Node B and the UEs and the SFN' may be used to initialize the shift register.

Embodiment 2

The random permutation function comprises the following steps in particular:

(1) establishing, between the receiver and transmitter, an initial permutation sequence Q(0), Q(1), . . . , Q(M−1) of length M=80; and (2) for any 0≦r<M, setting P(r, SFN')=Q((r+SFN')mod 80) so that a permutation sequence varying with time is obtained on basis of the sequence Q.

As an example, the initial random permutation sequence may be set as Q={1, 41, 21, 61, 11, 51, 31, 71, 6, 46, 26, 66, 16, 56, 36, 76, 4, 44, 24, 64, 14, 54, 34, 74, 9, 49, 29, 69, 19, 59, 39, 79, 3, 43, 23, 63, 13, 53, 33, 73, 8, 48, 28, 68, 18, 58, 38, 78, 5, 45, 25, 65, 15, 55, 35, 75, 10, 50, 30, 70, 20, 60, 40, 80, 2, 42, 22, 62, 12, 52, 32, 72, 7, 47, 27, 67, 17, 57, 37, 77}. Of course, the specific setting of the initial random permutation sequence in this embodiment is not defined thereto, and can be chosen according to the particular application, for example according to the number of UEs within one cell.

Embodiment 3 the random permutation function comprises the following steps in particular:

for any 0≦r<M, setting P(r, SFN')=(r+SFN')mod 80 so as to obtain a permutation sequence varying with time.

What is claimed is:

1. A method for assigning signature sequences for Enhanced Dedicated Channel Hybrid Automatic Repeat Request Acknowledgement Indicator Channel (E-HICH), comprising:
   firstly, assigning a logical signature sequence index r for each User Equipment (UE);
   wherein the method further comprising:
   then, converting the logical signature sequence index r into a physical signature sequence index r' varying with time by using a random permutation function; and
   after that, assigning a signature sequence corresponding to the physical signature sequence index r' to the respective UE;
   wherein the random permutation function is expressed by the following equation:

$$r'=P(r,SFN'),$$

wherein SFN' is representative of a sub-frame number in which E-HICH is in, P is representative of the random permutation function;
   wherein the random permutation function is implemented by:
   (1) initializing a permutation sequence, which comprises setting the length M of the permutation sequence as M=80, and initializing the permutation sequence to P, wherein P(0)=0, P(1)=1, . . . , P(M−1)=M−1; and then setting i=0;
   (2) calculating a permutation sequence P related to a system sub-frame number SFN', which comprises:
   a) generating a random number k ranged from 0~M−i;
   b) permuting P(i) with P(k+i); and
   c) i=i+1;
   repeating the above steps a)-c) until i=M−2.

2. The method for assigning signature sequences for E-HICH channel as in claim 1, wherein the random permutation function is known to both a Node B and the respective UE, and is implemented by consolidating the random permutation function in the Node B and in the respective UE, or by having the Node B signal the random permutation function used to the respective UE.

3. The method for assigning signature sequences for E-HICH channel as in claim 1, wherein a shift register is used for generating the random number k, comprising:
   I. having a length of the shift register as N, and initializing the shift register;
   II. choosing p so that $i<2^p$;
   III. shifting the shift register s times consecutively, wherein s≧p, and resulting an output sequence x, and setting k=the p lowest significant bits of x; and
   IV. setting k=k−(M−i) if k>M−i.

4. The method for assigning signature sequences for E-HICH channel as in claim 3, wherein:
   the N bits of the system sub-frame number SFN' is used in the initialization of the shift register; or
   the N bits resulted from the calculation based on the combination of a cell Basic midamble code or a cell scrambling code and the SFN' are used in the initialization of the shift register.

5. The method for assigning signature sequences for E-HICH channel as in claim 1, wherein the random permutation function comprising:
   (1) establishing, between a receiver and a transmitter, an initial permutation sequence Q(0), Q(1), . . . , Q(M−1) of length M=80; and
   (2) for any 0≦5<M, setting P(r, SFN')=Q((r+SFN')mod 80).

6. The method for assigning signature sequences for E-HICH channel as in claim 1, wherein the random permutation function comprising:
   for any 0≦r<M, setting P(r, SFN')=(r+SFN')mod 80.

* * * * *